(No Model.)
A. HOTCHKISS.
DEVICE FOR CRESTING FENCES.
No. 282,895. Patented Aug. 7, 1883.
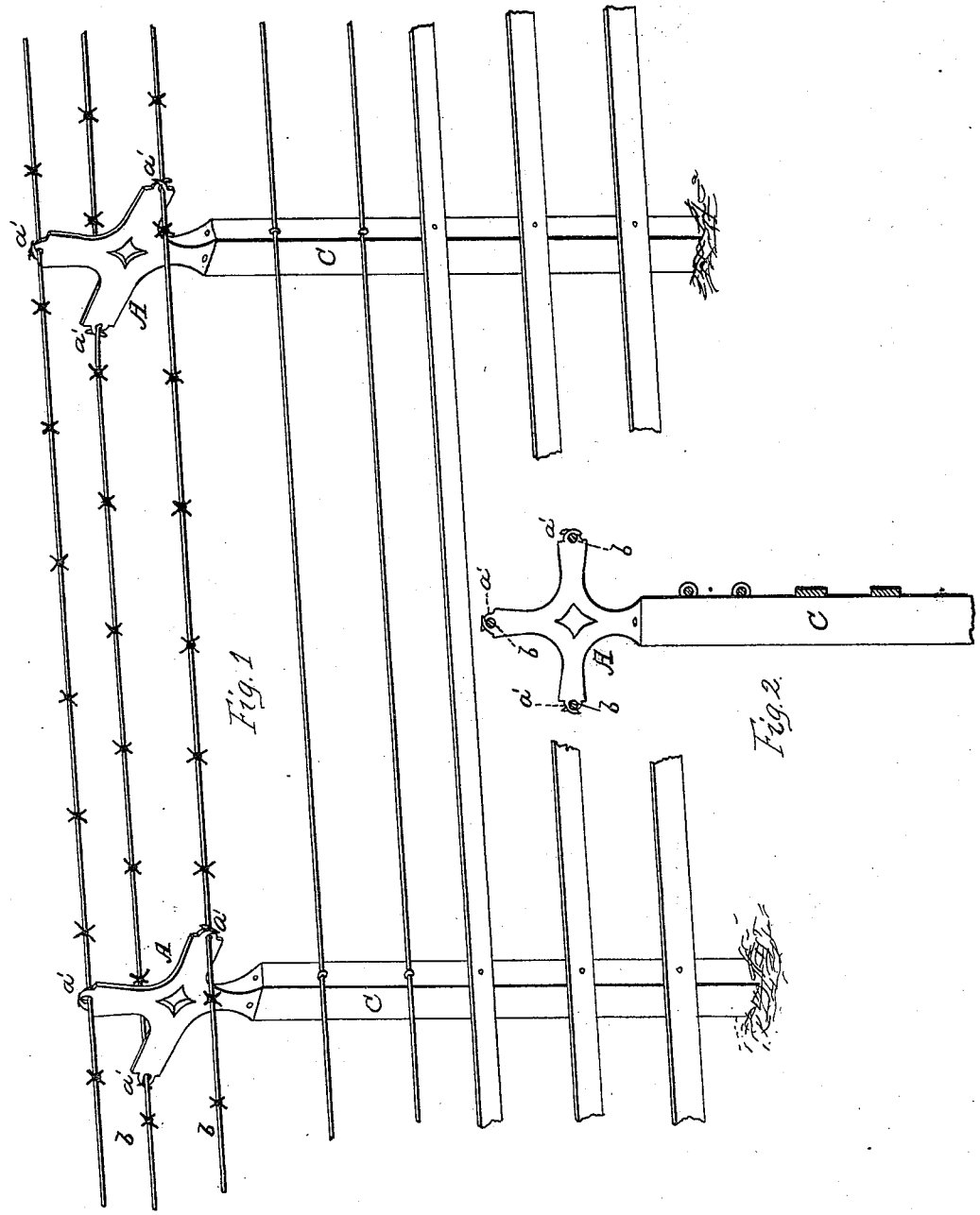
WITNESSES
J. M. Smith
L. E. Bates
INVENTOR
Almerino Hotchkiss.
By Frank Sheehy,
ATTORNEYS

UNITED STATES PATENT OFFICE.

ALMERINO HOTCHKISS, OF ST. LOUIS, MISSOURI.

DEVICE FOR CRESTING FENCES.

SPECIFICATION forming part of Letters Patent No. 282,895, dated August 7, 1883.

Application filed December 4, 1882. (No model.)

*To all whom it may concern:*

Be it known that I, A. HOTCHKISS, a citizen of the United States, and a resident of St. Louis, in the State of Missouri, have invented certain new and useful Improvements in Devices for Cresting Fences; and I do hereby declare the following to be a full, clear, and exact description of the same.

Figure 1 is a representation of a section of a fence, partly broken away, with my improvements applied; and Fig. 2 is a transverse sectional view of a fence, showing a post with one of my brackets.

This invention has relation to improvements in fences; and it consists in the combination and arrangement, in connection with a fence, of brackets or bracketed post-tops set in vertically-transverse position to the line of fence, and provided with jaws to receive and hold barbed wire or cable in position, overhanging front and rear and surmounting the top of the fence, as more fully hereinafter specified.

The main object of this invention is to provide a cheap and unsurmountable fence for orchards, vineyards, and public and private grounds, by means of which the top or crown of a wire or ordinary fence may be crested with an expanse of barbed wire, that intruders using the fence-wires as plank-bars or ladder-steps will not be able to surmount and scale by reason of the difficulty in reaching and straddling over.

In the drawings, A indicates a bracket, which is preferably made of wrought or cast iron; but may be made of any suitable material, and provided at the outer end of each arm with jaws $a'$, which are adapted to receive fence wires or cables $b$, which may be barbed or plain, as desired. The said bracket is formed on or attached to the fence-post $c$, the horizontal arms extending to each side, so as to cause the wires to overhang the fence on both sides, the central arm extending above the top of the fence, so as to hold the central wire directly over it.

It will be perceived that by reason of the wires oversetting the upper edge of the fence and extending over the top it will be impossible to scale the fence, as an intruder, owing to their relative position, could not pass from one to another.

Having thus described my invention, what I claim as new is—

A crest for fences, consisting of a series of brackets mounted on the fence-posts, and having two horizontal arms extending to each side of the fence, and a vertical arm extending above, and the wires secured in suitable jaws on the brackets by crossing the jaws over them, the side wires being so arranged as to overhang the fence, and the central wire to extend over it and parallel with it, substantially as specified.

ALMERINO HOTCHKISS.

Witnesses:
R. E. BARLOW,
W. L. GRAYDON.